United States Patent
Dahan et al.

(10) Patent No.: US 12,148,410 B1
(45) Date of Patent: Nov. 19, 2024

(54) METHOD AND SYSTEM FOR REAL-TIME SUPPRESSION OF SELECTED VOICES IN DIGITAL STREAM DISPLAYED ON SMART TV

(71) Applicants: Meir Dahan, Tiberias (IL); Eliahu Antopolsky, Zichron Yaakov (IL)

(72) Inventors: Meir Dahan, Tiberias (IL); Eliahu Antopolsky, Zichron Yaakov (IL)

(*) Notice: Subject to any disclaimer, the term of this patent is extended or adjusted under 35 U.S.C. 154(b) by 0 days.

(21) Appl. No.: 18/772,198

(22) Filed: Jul. 14, 2024

(51) Int. Cl.
| | | |
|---|---|---|
| *G10K 11/175* | (2006.01) | |
| *G10L 17/02* | (2013.01) | |
| *H04N 21/439* | (2011.01) | |

(52) U.S. Cl.
CPC .......... *G10K 11/1754* (2020.05); *G10L 17/02* (2013.01); *H04N 21/4394* (2013.01)

(58) Field of Classification Search
None
See application file for complete search history.

(56) References Cited

U.S. PATENT DOCUMENTS

| | | | | |
|---|---|---|---|---|
| 8,041,026 B1 * | 10/2011 | Coughlan | ........... | G10L 21/0208 379/406.01 |
| 8,635,237 B2 * | 1/2014 | Bansal | ................ | G06F 16/951 704/251 |
| 8,639,516 B2 * | 1/2014 | Lindahl | ............... | G10L 21/0208 704/275 |
| 2013/0163772 A1 * | 6/2013 | Kobayashi | ............... | H04K 3/43 381/71.1 |
| 2023/0095526 A1 * | 3/2023 | Chen | ....................... | G10L 17/08 704/243 |
| 2024/0212689 A1 * | 6/2024 | Mohammad | .......... | G10L 21/028 |

FOREIGN PATENT DOCUMENTS

| | | | | | |
|---|---|---|---|---|---|
| CN | 112820291 A | * | 5/2021 | ............. | G10L 15/02 |
| CN | 116886956 A | * | 10/2023 | | |
| CN | 117499573 A | * | 2/2024 | ............. | G10L 15/22 |
| EP | 3070876 A1 | * | 9/2016 | | |

* cited by examiner

*Primary Examiner* — Qin Zhu

(57) ABSTRACT

A system integrated in a smart TV that suppresses in real-time a selected voice of a specific person in a digital audio stream that includes an audio processor, a setting module, a user interface, and an input mechanism. The system selects the voice of the specific person, creates a voice profile of that voice that includes voice parameters, stores the voice profile, continuously monitors the voice parameters in digital audio stream received by the audio processor, suppresses identified voices that match those parameters o in the received digital audio stream, and send a clean digital audio stream to be played through the speakers of the smart TV. The input mechanism may select the voice by using a key when the voice is heard through the speakers, may assign identification to the selected voice, and may remove the selected voice stored in the audio processor.

12 Claims, 2 Drawing Sheets

METHOD AND SYSTEM FOR REAL-TIME SUPPRESSION OF SELECTED VOICES IN DIGITAL STREAM DISPLAYED ON SMART TV

TECHNICAL FIELD

The present invention refers to method and system for real-time suppression of selected voices of certain persons in digital stream displayed on a smart TV.

BACKGROUND ART

In many cases a person watches television broadcasts (on television or on a computer) and is interested not to hear speeches of a specific person, who could be a political commentator on a news panel, or a sports commentator or any other person. The present invention provides a good solution to this problem.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

Figure 1:
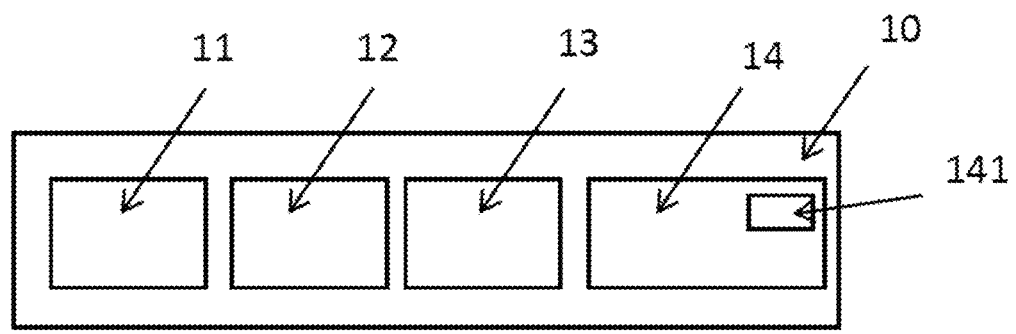
FIG. 1 is a schematic illustration of the system (10).

The main objective of the present invention is to provide a system (10) for suppressing in real-time a selected voice (91) of a specific person in a digital audio stream (92) that may be as usually a real-time signal. The digital audio stream may be a part of a digital video stream content (93) that includes the video and the audio signals that is received by a smart TV (100) that its audio is designed to be played through the speakers (101) of the smart TV and its video is designed to be displayed on its display (102). We will refer to the smart TV also with the term "device" for sake of fluency.

The system (10) comprises an audio processor (11), a setting module (12), a user setting interface (13), and an input mechanism (14). The audio processor (11) is integrated in the device and is designed to suppress the selected voice in the digital audio stream. The settings module (12) is accessible through the user setting interface (13) of the device, for allowing the user to configure, by the input mechanism (14) of the device, the settings module that may include the setting menu of the device that allows the user to select the unwanted voice and to control other aspects of this feature.

The term "smart TV" (or the term "device") in this disclosure and the claims refers to any kind of television that is designed to be connected to a TV cable box or to a satellite receiver or televisions with an internet connection that are designed to receive and display digital video stream content, and any kind of computing device with internet connection and a display that is designed to receive and display digital video stream content, such as desktop computers, laptops, tablets, and smartphones. Modern TVs and/or computers and/or smartphones comprise several main components for receiving, processing, and displaying the digital signals. These main components may include the display panel (or screen), a receiver, speakers, sound amplifier, a video processor, motherboard, a power supply and various input and output connections. The process of capturing, editing and encoding video requires high-end hardware including processors and memory means RAM. These main components are known to experts in the field and therefore we will not detail them in this disclosure or in the claims. These components can be on a TV as well as a computer, perform similar actions, although they have different names, and the designations in this disclosure and in the claims should be adjusted accordingly.

The term "input mechanism" in this disclosure and the claims refers to remote controls of smart TVs, buttons on the smart TVs for operating the device, mouse and/or keyboard when the smart TV is a type of a computer, or a touch screen when the smart TV is a type of tablet or a smartphone. The input mechanism is configured to enable the user to use the feature. The input mechanism may be a combination of mechanisms such as a virtual keyboard interface, touch buttons on the screen.

The audio processor (11) is configured to receive the digital audio stream (92). The audio processor (11) may receive the digital audio stream from another processor or from a computing device in the device after being decoded and converted to be displayed. Usually, the device receives digital video stream content from the provider by the Wi-Fi or Ethernet module that connects the device to the internet that allows the device to receive data packets from the streaming service over the internet. The smart TV by a TV's processor (often referred to as the SoC, or System on Chip) handles the decoding of the video stream, converting it from a compressed format into a format that can be displayed on the screen. The key components involved in this process include: Wi-Fi/Ethernet Module, for internet connectivity; Processor (SoC), for processing and decoding the video stream; Memory (RAM and Storage), for buffering and storing the video data temporarily; GPU (Graphics Processing Unit), or rendering the video to the display. These components work together to receive, decode, and display digital video streaming content on a smart TV. The digital video streaming content (after having the process above) comprises the digital audio streaming and a digital video streaming (94). The term "audio processor" means a processor, that can be one or more processors, and that may include, inside or associated, a memory that is positioned together with the audio processor inside the device and may be a processor that provides other standard functions for the device.

It is preferably that the audio processor (11) will be a powerful CPU/GPU for real-time audio processing, capable of running machine learning models for voice identification and suppression. In addition to that, it is preferably that the audio processor (11) will have or will be associated with an adequate RAM and storage to handle and process of the audio data efficiently. It is possible that the connectivity of the audio processor may include HDMI/Audio In and Out ports to connect it to other parts of the smart TV and USB or Bluetooth interface for user control and updates.

From a hardware optimization point of view, it is preferably to design the smart TV (or to add to it) with dedicated hardware that will include the audio processor (11) for efficient audio processing, such as specialized DSP (Digital Signal Processing) chips, which may be more efficient than external processing units. In addition to that, direct integration with the operating system and audio drivers of the smart TV allow for lower latency and more efficient processing, and preferably a built-in connectivity without the need for additional ports or devices.

The user setting interface (13) that may be a part of the device is configured to enable the user to select by using the input mechanism (14) the voice that is heard through the speakers to be suppressed; means that this voice will not be heard through the speakers. The user may select the unwanted voice by pressing a key (141) that may be a button or a symbol on a touch screen during the time in which the unwanted voice is heard through the speakers. It is possible that the user setting interface will be a part of the settings or the menu of the device, and may be configured to allow the user to refine the selected voice directly through the device's interface.

The audio processor (11) is configured to mark the selected voice, according to the user's selection.

The audio processor (11) is configured to create a voice profile (95) of the selected voice (91), and to store this voice profile that includes voice parameters. The audio processor is designed to analyze the characteristics of the selected voice and to create the unique profile for the selected voice, preferably by using machine learning techniques. The voice profile may by created by an artificial intelligence and machine learning programs (stored in the smart TV or on a cloud) that can create a voice biometric profile that can differ the selected voice from voices of other people. Voice biometrics is a known technology that identifies and authenticates users by their voice. This technology considers that the human voice is unique, and each person has a distinctive frequency pattern and features in their voice. This technology is simple: the voice (the signals that represent the 'voice') is analyzed to get a set of features to identify the person. Rhythm, pitch, frequency, and timbre are some of the characteristics that may be used in the voice analysis. The audio processor may be function as a voice biometrics system that may use machine learning algorithms that analyze and compare the examined voice features with other voices in the digital audio stream, and if the match is high enough the system determine that this voice should be suppressed. This method is reliable and even banks use this voice recognition as a password to access bank services.

The audio processor (11) is configured to continuously monitor the digital audio stream (92) to identify the parameters of the selected voice (91), or better to say voices that match the voice profile (95) in the digital audio stream.

The audio processor (11) is configured to suppress the identified voices that match the selected voice (the parameters of the voice profile) in the digital audio stream, and by that to prevent the unwanted voice to be heard through the speakers of the device. The audio processor (11) is configured to suppress the identified voices while preserving other audio elements including voices of other people; that do not match said parameters of said voice profile of the selected voice). We will refer to digital audio streaming after suppression of the unwanted voices with the term "clean digital audio stream" (96).

The fact that the system (10) is integrated in the smart TV (100) minimizes delays due to direct integration with the smart TV's audio and video processing systems. The direct integration of the system (10) with the smart Tv's hardware and software leads to more efficient processing and lower latency. It is preferable that the built-in hardware (including the audio processor) is powerful enough to handle real-time processing without affecting the overall performance of the smart TV. By integrating the voice suppression system directly into smart TVs and computers, manufacturers can offer a more streamlined, efficient, and user-friendly solution for real-time voice suppression.

The system analyzes and creates the voice profile for the selected voice that is stored and used for the real-time suppression. The audio processor (11) continuously processes the audio stream using its built-in hardware and software. When the identified voice is detected, it applies suppression algorithms, minimizing the unwanted voice in real-time. The remaining audio is played through the smart TV's integral speakers with minimal latency. It is known how to separate HDMI audio from video, and the digital audio stream can be extracted and separated from the digital audio stream content (that includes the video and the audio signals).

The system (100) may enable a situation where the selection of the voices to be suppressed will be saved in the audio processor (even in the case of turning the device off and on), and will be permanently suppressed whenever the system (10) detects these unwanted voices. The user setting interface may include the option to remove selected voices from the memory using the input mechanism. The system (10) may include an option to add an identification mark to each selected voice, the name of the specific person, his nickname or any text or symbol that will allow the user to identify who it is, among other things, so that it can be removed from the list of the unwanted voices. The system may include an icon (142) that will appear on the screen (display) whenever the selected voice is deleted from played sound, this icon may include the identification mark entered by the user for that selected voice.

Figure 2:
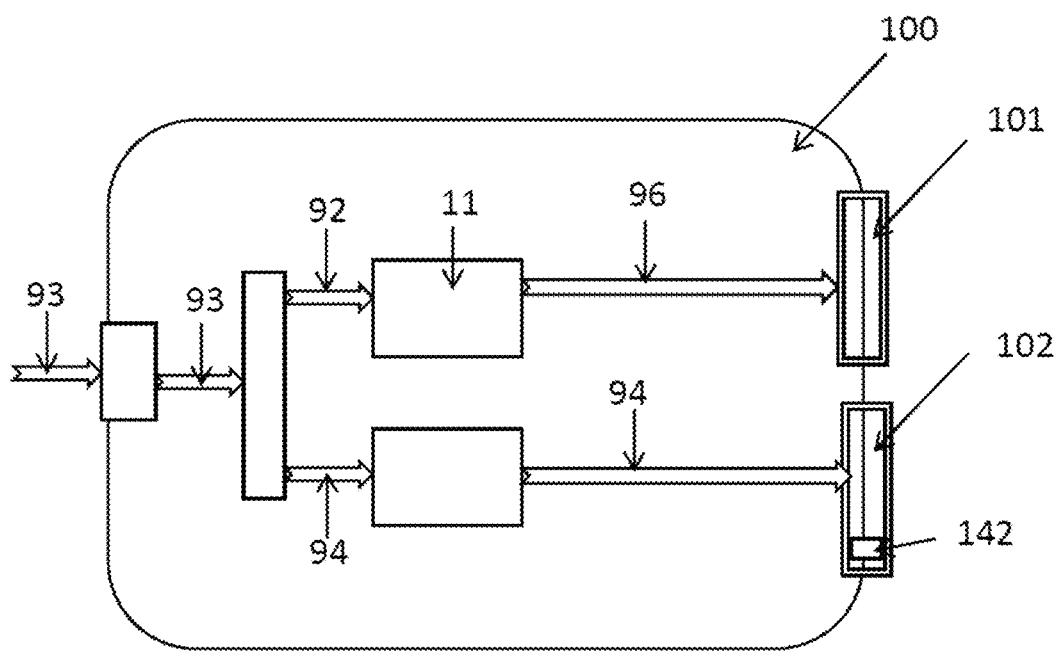
FIG. 2 is a schematic illustration of the smart TV (100).
Figure 3:
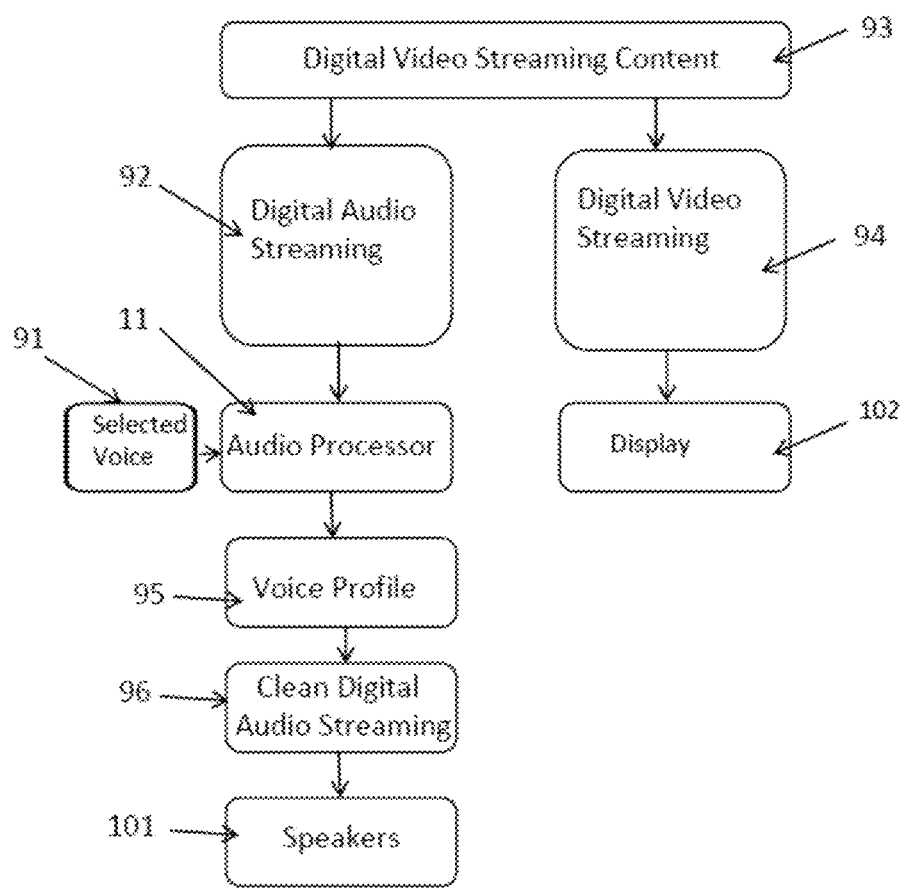
FIG. 3 is a flow illustration of the path of the processed signals.

FIG. 1 is a schematic illustration of the system (10) that comprises the audio processor (11), the setting module (12), the user setting interface (13), and the input mechanism (14). FIG. 2 is a schematic illustration of the smart TV (100), and FIG. 3 is a card flow illustration of the path of the signals from the moment they are received until played and displayed by the smart TV.

What is claimed is:

1. A system integrated in a smart TV for suppressing in real-time a selected voice of a specific person in a digital audio stream, comprising:
    an audio processor,
    a setting module,
    a user setting interface, and
    an input mechanism,
wherein the system is configured to:
    select, via the input mechanism, the voice of the specific person;
    create, via the audio processor, a voice profile of the selected voice that includes voice parameters;
    store, in the audio processor, the created voice profile;
    continuously monitor, via the audio processor, the voice parameters in the digital audio stream received by the audio processor;
    suppress, via the audio processor, identified voices that match the voice parameters of the voice profile of the selected voice in the received digital audio stream; and
    send, via the audio processor, a clean digital audio stream designed to be played through speakers of the smart TV.

2. The system of claim 1, wherein the input mechanism is further configured to select said voice by using a key when said voice is heard through said speakers.

3. The system of claim 1, wherein said audio processor is further configured to store said selected voice and said voice profile.

4. The system of claim 1, wherein said input mechanism is further configured to assign an identification to said selected voice stored in said audio processor.

5. The system of claim 1, wherein said input mechanism is further configured to remove said selected voice stored in said audio processor.

6. The system of claim 1, further configured to display an icon on said display of said smart TV when said selected voice is suppressed.

7. A method for suppressing in real-time a selected voice of a specific person in a digital audio stream in a smart TV, comprising:

selecting, by an input mechanism integrated in the smart TV, the voice of the specific person;

creating, by an audio processor integrated in the smart TV, a voice profile of the selected voice that includes voice parameters;

storing, in the audio processor, the created voice profile;

continuously monitoring, by the audio processor, the voice parameters in the digital audio stream received by the audio processor;

suppressing, by the audio processor, identified voices that match the voice parameters of the voice profile of the selected voice in the received digital audio stream; and sending, by the audio processor, a clean digital audio stream designed to be played through speakers of the smart TV.

8. The method of claim 7, wherein said input mechanism is further configured to select said voice by using a key when said voice is heard through said speakers.

9. The method of claim 7, wherein said audio processor is further configured to store said selected voice and said voice profile.

10. The method of claim 7, wherein said input mechanism is further configured to assign an identification to said selected voice stored in said audio processor.

11. The method of claim 7, wherein said input mechanism is further configured to remove said selected voice stored in said audio processor.

12. The method of claim 7, wherein said audio processor is further configured to display an icon on said display of said smart TV when said selected voice is suppressed.

* * * * *